UNITED STATES PATENT OFFICE.

WILLIAM H. WALKER, OF BOSTON, MASSACHUSETTS.

METHOD OF MAKING FORMIC ACID.

970,145.  Specification of Letters Patent.  Patented Sept. 13, 1910.

No Drawing.   Application filed April 28, 1908.  Serial No. 429,710.

*To all whom it may concern:*

Be it known that I, WILLIAM H. WALKER, a citizen of the United States, residing at Boston, in the county of Suffolk and State of Massachusetts, have invented certain new and useful Improvements in Methods of Making Formic Acid, of which the following is a specification.

The object of this invention is to provide an efficient and economical method of making formic acid from formates soluble in formic acid.

It is well known that formic acid decomposes readily in the presence of concentrated sulfuric acid, and that high efficiency in the production of formic acid by reacting with strong sulfuric acid upon formates can be secured only under special operating conditions. Thus if sulfuric acid of high concentration be added to commercial sodium formate or dropped thereon, particularly if the formate contains such considerable proportions of water as are usually present in the commercial salt, there is a local rise of temperature at the region of contact accompanied by the production of a considerable quantity of formic acid: this acid being an excellent solvent for sodium formate provides conditions under which the reaction proceeds with great rapidity, the evolution of heat being so rapid that the temperature cannot be effectively controlled, and under the high temperature conditions which result from the reaction the formic acid produced is subject to decomposition.

I have observed that in the reaction between sodium formate and strong sulfuric acid decomposition of the formic acid is most liable to occur during the early stages of the reaction while the mass is yet comparatively solid; for at this stage its heat-conductivity is low and it cannot be brought into effective contact with the metal walls of the jacketed container or reaction vessel, and hence cools slowly. Sodium formate is quite soluble in strong formic acid, but sodium sulfate is practically insoluble therein; therefore as the addition of sulfuric acid proceeds, although the amount of liquid formic acid is increased, the separated and insoluble sodium sulfate acts to stiffen the mass in such manner that when the quantity of sulfuric acid requisite for the reaction has been added the mass is in the condition of a stiff paste. I have discovered that by proceeding under conditions as hereinafter set forth, the mass may be maintained in a creamy or comparatively fluid and mobile condition during the earlier stages of the reaction, when as above stated the formic acid is most liable to decomposition; it may therefore be effectively cooled during this critical period and a high degree of efficiency may be maintained for the entire operation. This relatively fluid condition of the mass is secured by maintaining until the final stage of the reaction certain proper proportions between the several constituents, the free formic acid being in sufficient proportion to dissolve the sodium formate present.

I may proceed substantially as follows: I first take sodium formate in such comparatively small quantity that it can be effectively stirred and cooled, and add thereto with suitable cooling sulfuric acid of proper concentration, say 88%, until the proportion of acid added is approximately one-half that required for the decomposition of the sodium formate initially taken: at this stage the mass exists in a relatively mobile or creamy state as compared with its condition in presence either of a substantially greater or lesser proportion of sulfuric acid. The reaction to this point may be expressed as follows:

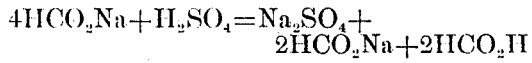

The formic acid liberated by the addition of sulfuric acid in the above indicated proportions is sufficient to dissolve the remaining sodium formate to a greater or less extent depending on the temperature, and the proportion of sodium sulfate to this solution is yet insufficient to convert it into a stiff paste, the mixture having therefore the creamy consistence above referred to. It will be understood that with a substantially less proportion of sulfuric acid undissolved sodium formate would be present to stiffen the mass, whereas with a substantially larger proportion the same effect would be exerted by the separated insoluble sodium sulfate. Obviously the proportions need not be precisely as stated, it being essential merely that the mobile or creamy condition decribed should be maintained during the stages of the reaction requiring strong cooling. Having obtained the creamy mass re- 11 ferred to the same is stirred and cooled by any appropriate means, and sodium formate and sulfuric acid are added in the approximate proportions of one-half the equivalent of sulfuric acid to the formate, and the mass is maintained in the creamy and easily agitated and readily cooled condition until the entire quantity of sodium formate has been added. At this period, the residual undecomposed formate being largely or completely dissolved in the formic acid present, the sulfuric acid requisite for completing the reaction can be added without danger of over-heating. The liberated formic acid is distilled over and collected in the usual manner.

Any appropriate apparatus may be used for carrying the method into effect, a water-jacketed kettle provided with a rotary stirrer being suitable.

I claim:

1. The method of making formic acid from formates, which consists in reacting upon a formate with sulfuric acid in less than the molecular equivalent and in proportion to form a relatively mobile mass, adding to the resulting mass further quantities of formate and sulfuric acid in proportion to maintain the proper degree of fluidity while controlling the temperature, then adding the sulfuric acid requisite for completing the reaction, and recovering the formic acid by distillation.

2. The method of making formic acid from formates, which consists in reacting upon a formate with approximately one-half the molecular equivalent of sulfuric acid, adding to the resulting mass further quantities of formate and sulfuric acid in proportion to maintain the proper degree of fluidity while controlling the temperature, then adding the sulfuric acid requisite for completing the reaction, and recovering the formic acid by distillation.

In testimony whereof, I affix my signature in presence of two witnesses.

WILLIAM H. WALKER.

Witnesses:
W. B. KEITH,
EDWIN R. BOND.